US012116651B1

United States Patent
Li et al.

(10) Patent No.: US 12,116,651 B1
(45) Date of Patent: Oct. 15, 2024

(54) STIRRING MECHANISM FOR EXTRACTING LITHIUM FROM WASTE LIQUID OF LITHIUM IRON PHOSPHATE BATTERY

(71) Applicants: GUANGDONG BRUNP RECYCLING TECHNOLOGY CO., LTD., Guangdong (CN); HUNAN BRUNP RECYCLING TECHNOLOGY CO., LTD., Hunan (CN)

(72) Inventors: Aixia Li, Guangdong (CN); Haijun Yu, Guangdong (CN); Changdong Li, Guangdong (CN); Yinghao Xie, Guangdong (CN)

(73) Assignees: GUANGDONG BRUNP RECYCLING TECHNOLOGY CO., LTD., Guangdong (CN); HUNAN BRUNP RECYCLING TECHNOLOGY CO., LTD., Hunan (CN)

( * ) Notice: Subject to any disclaimer, the term of this patent is extended or adjusted under 35 U.S.C. 154(b) by 0 days.

(21) Appl. No.: 18/558,151

(22) PCT Filed: Jul. 15, 2022

(86) PCT No.: PCT/CN2022/106011
§ 371 (c)(1),
(2) Date: Oct. 30, 2023

(87) PCT Pub. No.: WO2023/231157
PCT Pub. Date: Dec. 7, 2023

(30) Foreign Application Priority Data

Jun. 2, 2022 (CN) .......................... 202210620036.4

(51) Int. Cl.
*C22B 26/12* (2006.01)
*C22B 3/02* (2006.01)
(Continued)

(52) U.S. Cl.
CPC ................ *C22B 26/12* (2013.01); *C22B 3/02* (2013.01); *H01M 10/54* (2013.01); *H01M 4/5825* (2013.01); *H01M 10/0525* (2013.01)

(58) Field of Classification Search
None
See application file for complete search history.

(56) References Cited

U.S. PATENT DOCUMENTS

| 2000/1020657 | 9/2001 | Gloor |
| 2019/0161357 A1 | 5/2019 | Liu et al. |

FOREIGN PATENT DOCUMENTS

| CN | 105742744 | 7/2016 |
| CN | 206334666 | 7/2017 |

(Continued)

OTHER PUBLICATIONS

International Search Report issued for the PCT application No. PCT/CN2022/106011 on Dec. 28, 2022 with English translation (6 pages).

(Continued)

*Primary Examiner* — Stefanie J Cohen
(74) *Attorney, Agent, or Firm* — Leason Ellis LLP (57) ABSTRACT

Disclosed is a stirring mechanism for extracting lithium from a waste liquid of a lithium iron phosphate battery, including a pedestal, a clamping mechanism and a stirring mechanism; the clamping mechanism is movably connected to a bottom portion of the pedestal; the stirring mechanism is rotatably arranged between the pedestal and the clamping mechanism; the stirring mechanism includes a motor, a rotating member and a stirring member; the rotating member (Continued)

is rotatably arranged in a center of a fixed portion of the clamping mechanism, and the rotating member is obliquely arranged; the stirring member is detachably connected to a bottom portion of the rotating member; and the stirring member includes a connecting base, a separating hopper and a stirring wheel which are connected in sequence.

8 Claims, 4 Drawing Sheets

(51) Int. Cl.
  *H01M 10/54* (2006.01)
  *H01M 4/58* (2010.01)
  *H01M 10/0525* (2010.01)

(56) References Cited

FOREIGN PATENT DOCUMENTS

| | | |
|---|---|---|
| CN | 109921123 | 6/2019 |
| CN | 110860226 | 3/2020 |
| CN | 211246225 | 8/2020 |
| CN | 213416506 | 6/2021 |
| CN | 214115126 | 9/2021 |
| CN | 214863166 | 11/2021 |
| CN | 215138965 | 12/2021 |
| JP | H11226372 | 8/1999 |
| JP | 2001508925 | 7/2001 |
| JP | 2005026088 | 1/2005 |
| WO | 2018209164 | 11/2018 |

OTHER PUBLICATIONS

Written Opinions of the International Searching Authority issued for the PCT application No. PCT/CN2022/106011 on Dec. 27, 2022 with English translation (4 pages).

First Search Report for Chinese family member. CN115178134A on Apr. 24, 2023.with English translation (5 pages).

Nali et al., "Review on the Recovery Technology of Waste Lithium Rron Phosphate", Dec. 20, 2019 (6 pages) with English Translation.

Chinese Office Action in CN Application No. 202210620036.4, mailed Apr. 27, 2023 (7 pages), an English Translation attached hereto.

STIRRING MECHANISM FOR EXTRACTING LITHIUM FROM WASTE LIQUID OF LITHIUM IRON PHOSPHATE BATTERY

CROSS-REFERENCE TO RELATED APPLICATION

This application is a national stage filing under 35 U.S.C. § 371 of international application number PCT/CN2022/106011, filed Jul. 15, 2022, which claims priority to Chinese patent application No. 202210620036.4 filed Jun. 2, 2022. The contents of these applications are incorporated herein by reference in their entirety.

TECHNICAL FIELD

The present disclosure relates to the technical field of waste battery recycling, and more particularly, to a stirring mechanism for extracting lithium from a waste liquid of a lithium iron phosphate battery.

BACKGROUND

Lithium iron phosphate battery is a lithium ion battery using lithium iron phosphate as a cathode material and carbon as an anode material. Due to the advantages of high working voltage, high energy density, long cycle life, good safety performance, low self-discharge rate and no memory effect, the lithium iron phosphate battery is widely used in the industry of new energy vehicles. With the upsurge of electrification in automobile industry, people have begun to pay attention to the recycling of lithium iron phosphate batteries for vehicles in the future.

The recycling of the lithium iron phosphate battery is mainly divided into two stages, where the first stage is to crush a lithium iron phosphate battery pack into lithium iron phosphate powder; and the second stage is to recycle the lithium iron phosphate powder to form a lithium salt product such as lithium carbonate by a physical or chemical method. A lithium element in the waste liquid of the existing lithium iron phosphate battery is mostly recycled by a chemical method—wet extraction, which means that the waste liquid of the lithium iron phosphate battery is mixed with other chemical solutions for reaction, other metal elements (such as iron, aluminum and manganese) in the waste liquid of the lithium iron phosphate battery are agglomerated and precipitated by continuously stirring the mixed solution, and finally, a precipitate is filtered and separated to obtain a lithium carbonate solution. However, in most of the existing operating devices, the mixed solution of the waste liquid of the lithium iron phosphate battery and other chemical solutions needs to be stirred manually, then other metal elements are waited to agglomerate and precipitate, and are filtered layer by layer to obtain the lithium carbonate solution. The overall operation is complicated with a long extraction time, and cannot satisfy a demand of conveniently extracting lithium from the waste liquid of the lithium iron phosphate battery.

SUMMARY

The present disclosure aims to provide a stirring mechanism for extracting lithium from a waste liquid of a lithium iron phosphate battery, so as to solve the problems in the background art above.

In order to achieve the object above, the technical solutions of the present disclosure are as follows: a stirring mechanism for extracting lithium from a waste liquid of a lithium iron phosphate battery includes a pedestal, a clamping mechanism and a stirring mechanism; the clamping mechanism is movably connected to a bottom portion of the pedestal; and the stirring mechanism is rotatably arranged between the pedestal and a fixed portion of the clamping mechanism; where the stirring mechanism includes a motor, a rotating member and a stirring member; the motor is fixed at one end of the pedestal; the rotating member is rotatably arranged in a center of the fixed portion of the clamping mechanism and connected to an output end of the motor, and the rotating member is obliquely arranged; the stirring member is detachably connected to a bottom portion of the rotating member; the stirring member includes a connecting base, a separating hopper and a stirring wheel which are connected in sequence; the connecting base is threadedly connected to the rotating member, and the connecting base is provided with a connecting claw for connecting the separating hopper on an outer side; and the separating hopper has a hopper-shaped structure with a large top and a small bottom, the separating hopper is provided with a spiral protrusion on an inner wall, a filter cylinder is vertically arranged above an opening at a bottom portion of the separating hopper, a top end of the filter cylinder extends to a bottom portion of the connecting base, and an isolation net is arranged in an opening at a bottom end of the separating hopper at a bottom portion of the filter cylinder.

Further, the clamping mechanism includes a movable plate and a fixed plate; the fixed plate is connected to a middle section at the bottom portion of the pedestal, and the fixed plate are provided with guide plates for limiting the movable plate on both sides; the movable plate is slidably arranged at the bottom portion of the pedestal on one side of the fixed plate far away from the motor; and the pedestal is also provided with a locking knob for locking the movable plate at one end far away from the motor.

Further, a middle portion of the movable plate is provided with a transverse bending section, and the movable plate at upper and lower ends of the transverse bending section and the fixed plate are parallel to each other.

Further, the rotating member includes a fixed end, a connecting end and a rotating shaft; the fixed end is connected to an output end of the motor, and the connecting end is obliquely connected to a bottom portion of the fixed end; and the rotating shaft is fixed at a bottom portion of the connecting end, and the rotating shaft is provided with a thread matched with the connecting base at a bottom end.

Further, a middle section of the rotating shaft is sleeved with a supporting end; and the fixed plate is provided with, on one side close to the rotating member, at least three limiting plates for limiting swing amplitudes of the fixed end, the rotating shaft and the supporting end.

Further, the stirring wheel includes a connecting frame and a baffle, the connecting frame is connected with the separating hopper, and blades are circumferentially arranged between the connecting frame and the baffle.

Further, the blades are hook-shaped, and a thickness of one end of the blade close to a central point of the connecting frame and the baffle is smaller than that of one end of the blade close to an outer circumference of the connecting frame and the baffle.

Compared with the existing technology, the present disclosure has the beneficial effects as follows:

(1) according to the present disclosure, by using the obliquely arranged rotating member, the rotating member and the stirring member form a certain angle with a central axis of a container during rotation with the motor, so as to expand a rotating and stirring range of the stirring member, and accelerate fusion between the waste liquid of the lithium iron phosphate battery and a chemical agent, thus making the mixed solution react quickly, so that other metal elements in the waste liquid of the lithium iron phosphate battery are quickly precipitated and agglomerated;

(2) according to the present disclosure, by using the connecting base with the connecting claw, the hopper-shaped separating hopper and the stirring wheel, when the solution enters the separating hopper from a gap of the connecting claw, a self-absorption phenomenon may occur between a bottom portion of the separating hopper and the stirring wheel, which accelerates flowing of the liquid between the separating hopper and the filter cylinder, so that other metal elements precipitated and agglomerated may be deposited in the filter cylinder under an action of the flowing solution, thus achieving the purpose of separating other metal elements in the waste liquid of the lithium iron phosphate battery, and reducing a complicated operation caused by manual stirring and a precipitate filtering operation; the spiral protrusion arranged on the inner wall of the separating hopper can accelerate the flowing of the solution inside the separating hopper during rotation of the separating hopper, thus promoting a precipitation rate of the solution at the filter cylinder, and improving an extraction efficiency of other metal elements in the waste liquid of the lithium iron phosphate battery; and (3) according to the present disclosure, the clamping mechanism is composed of the movable plate and the fixed plate, and a distance between the movable plate and the fixed plate is adjusted through the locking knob, so that the clamping mechanism may be adaptively adjusted according to a wall thickness of a lithium extraction container, thus being beneficial for stable assembly of the clamping mechanism and the lithium extraction container.

In the drawings, the members represented by the reference numerals are listed as follows:

1 refers to pedestal, 2 refers to locking knob, 3 refers to movable plate, 4 refers to fixed plate, 41 refers to limiting plate, 5 refers to motor, 6 refers to rotating member, 62 refers to connecting end, 61 refers to fixed end, 63 refers to rotating shaft, 64 refers to supporting end, 7 refers to stirring member, 71 refers to connecting base, 72 refers to separating hopper, 721 refers to spiral protrusion, 73 refers to stirring wheel, 731 refers to connecting frame, 732 refers to blade, 733 refers to baffle, and 74 refers to filter cylinder.

DETAILED DESCRIPTION

The embodiments of the present disclosure will be described in detail hereinafter. Examples of the embodiments are shown in the accompanying drawings. The same or similar reference numerals throughout the drawings denote the same or similar elements or elements having the same or similar functions. The embodiments described below with reference to the accompanying drawings are exemplary and are intended to explain the present disclosure, but should not be construed as limiting the present disclosure.

Embodiment 1

As shown in FIG. 1 to FIG. 5, a stirring mechanism for extracting lithium from a waste liquid of a lithium iron phosphate battery includes a pedestal 1, a clamping mechanism and a stirring mechanism. The clamping mechanism is movably connected to a bottom portion of the pedestal 1; and the stirring mechanism is rotatably arranged between the pedestal 1 and a fixed portion of the clamping mechanism. The stirring mechanism includes a motor 5, a rotating member 6 and a stirring member 7. The motor 5 is fixed at one end of the pedestal 1; the rotating member 6 is rotatably arranged in a center of the fixed portion of the clamping mechanism and connected to an output end of the motor 5, and the rotating member 6 is obliquely arranged; and the stirring member 7 is detachably connected to a bottom portion of the rotating member 6. The stirring member 7 includes a connecting base 71, a separating hopper 72 and a stirring wheel 73 which are connected in sequence. The connecting base 71 is threadedly connected to the rotating member 6, and the connecting base 71 is provided with a connecting claw for connecting the separating hopper 72 on an outer side; and the separating hopper 72 has a hopper-shaped structure with a large top and a small bottom, the separating hopper 72 is provided with a spiral protrusion 721 on an inner wall, a filter cylinder 74 is vertically arranged above an opening at a bottom portion of the separating hopper 72, a top end of the filter cylinder 74 extends to a bottom portion of the connecting base 71, and an isolation net is arranged in an opening at a bottom end of the separating hopper 72 at a bottom portion of the filter cylinder 74. A storage battery (not shown in the drawings) is arranged inside the pedestal 1 for supplying power to the motor 5. The filter cylinder 74 has a net structure, and a net gap of the filter cylinder 74 is larger than that of the isolation net in the opening at the bottom end of the separating hopper 72. The stirring mechanism may be fixed at a bottle mouth of a lithium extraction container through the clamping mechanism, and the stirring member 7 is immersed in the waste liquid of the lithium iron phosphate battery inside the lithium extraction container. The rotating member 6 and the stirring member 7 may be driven to stir the waste liquid of the lithium iron phosphate battery when the motor 5 rotates, and meanwhile, the stirring mechanism can be ensured to have sufficient stability in operation. Due to the oblique arrangement of the rotating member 6, the rotating member 6 and the stirring member 7 form a certain angle with a central axis of the container during rotation, so as to expand a stirring range of the stirring member 7 during rotation and stirring, and accelerate fusion between the waste liquid of the lithium iron phosphate battery and a chemical agent, thus making the mixed solution react quickly, so that other metal elements in the waste liquid of the lithium iron phosphate battery are quickly precipitated and agglomerated. During the rotation of the stirring member 7, since the outer side of the connecting base 71 is provided with the connecting claw, there is enough space at the opening above the separating hopper 72 to immerse the mixed solution, the filter cylinder 74 with a small size is arranged in a center inside the separating hopper 72, and the bottom end of the separating hopper 72 is also provided with the stirring wheel 73, so that when the solution enters the separating hopper 72 from a gap of the connecting claw, a self-absorption phenomenon may occur between the bottom portion of the separating hopper 72 and the stirring wheel 73, which accelerates flowing of the liquid between the separating hopper 72 and the filter cylinder 74, so that other metal elements precipitated and agglomerated may be deposited in the filter cylinder 74 under an action of the flowing solution, thus achieving the purpose of separating other metal elements in the waste liquid of the lithium iron phosphate battery, and reducing a complicated operation caused by manual stirring and a precipitate filtering operation. Moreover, the spiral protrusion 721 arranged on the inner wall of the separating hopper 72 can accelerate the flowing of the solution inside the separating hopper 72 during rotation of the separating hopper 72, thus promoting a precipitation rate of the solution at the filter cylinder 74, and improving an extraction efficiency of other metal elements in the waste liquid of the lithium iron phosphate battery.

Figure 1:
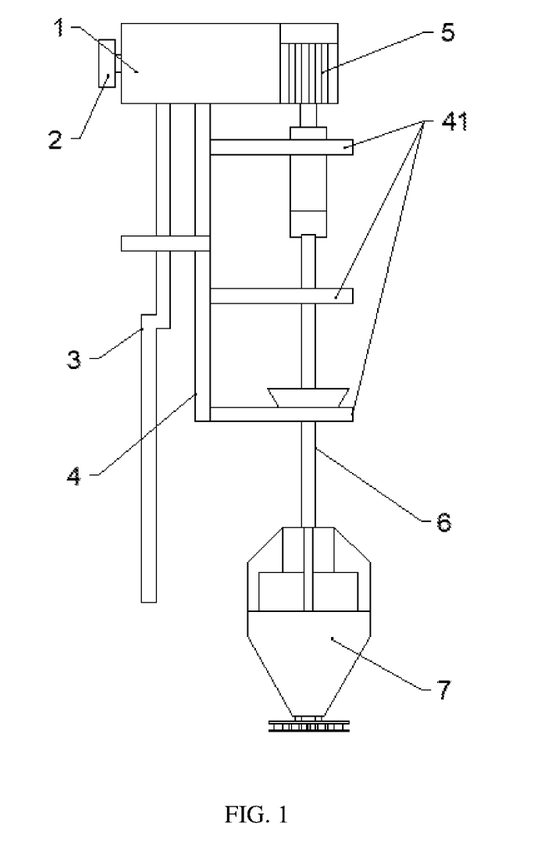
FIG. 1 is a schematic structural diagram of a side view of the present disclosure.
Figure 2:
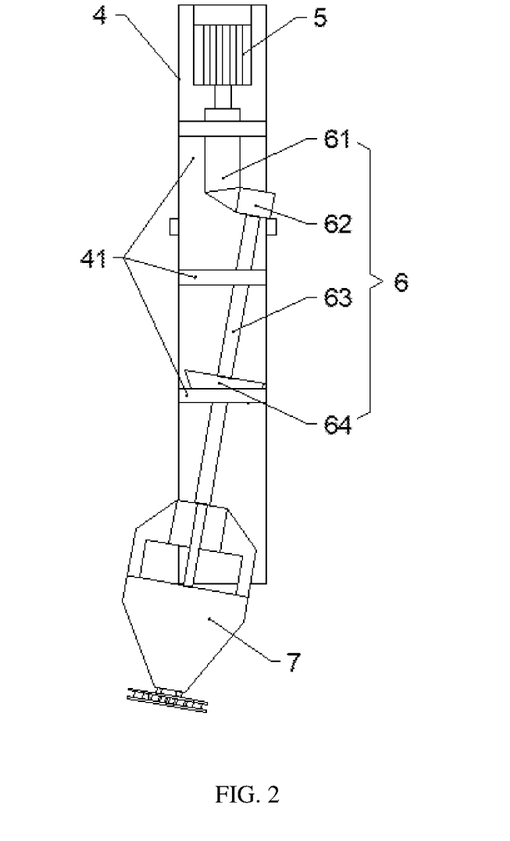
FIG. 2 is a schematic structural diagram of a front view of the present disclosure.

As shown in FIG. 1 and FIG. 2, in the embodiment, the clamping mechanism includes a movable plate 3 and a fixed plate 4. The fixed plate 4 is connected to a middle section at the bottom portion of the pedestal 1, and the fixed plate 4 are provided with guide plates for limiting the movable plate 3 on both sides; the movable plate 3 is slidably arranged at the bottom portion of the pedestal 1 on one side of the fixed plate 4 far away from the motor 5; and the pedestal 1 is also provided with a locking knob 2 for locking the movable plate 3 at one end far away from the motor 5. In the embodiment, a middle portion of the movable plate 3 is provided with a transverse bending section, and the movable plate 3 at upper and lower ends of the transverse bending section and the fixed plate 4 are parallel to each other. A sliding groove (not shown in the drawings) is arranged inside the pedestal 1 for the movable plate 3 to generate a sliding displacement, so that a gap between the movable plate 3 and the fixed plate 4 may be changed by rotating the locking knob 2, thus adaptively adjusting the clamping mechanism according to a wall thickness of the lithium extraction container. The movable plate 3 forms a movable portion of the clamping mechanism, the fixed plate 4 forms a fixed portion of the clamping mechanism, and when the movable plate 3 and the fixed plate 4 are assembled with the lithium extraction container, the movable plate 3 is located on an outer side wall of the lithium extraction container, and the fixed plate 4 is located on the inner side wall of the lithium extraction container, so that when the locking knob 2 is rotated to push the movable plate 3 to move towards the fixed plate 4 at the bottom portion of the pedestal 1, the transverse bending section of the movable plate 3 may be placed at the bottle mouth of the lithium extraction container to be supported, thus ensuring that the movable plate 3 and the fixed plate 4 may be stably clamped on the inner and outer side walls of the lithium extraction container, and realizing stable assembly of the clamping mechanism and the lithium extraction container. In order to prevent the movable plate 3 and the fixed plate 4 from damaging the inner and outer side walls of the lithium extraction container during clamping with the lithium extraction container, rubber gaskets may be arranged on opposite end faces of the movable plate 3 and the fixed plate 4, which can not only prevent the movable plate 3 and the fixed plate 4 from sliding during clamping, but also effectively reduce abrasion of the movable plate 3 and the fixed plate 4 on the side walls of the lithium extraction container.

As shown in FIG. 1 and FIG. 2, in the embodiment, the rotating member 6 includes a fixed end 61, a connecting end 62 and a rotating shaft 63. The fixed end 61 is connected to an output end of the motor 5, and the connecting end 62 is obliquely connected to a bottom portion of the fixed end 61; and the rotating shaft 63 is fixed at a bottom portion of the connecting end 62, and the rotating shaft 63 is provided with a thread matched with the connecting base 71 at a bottom end. In the embodiment, a middle section of the rotating shaft 63 is sleeved with a supporting end 64; and the fixed plate 4 is provided with, on one side close to the rotating member 6, at least three limiting plates 41 for limiting swing amplitudes of the fixed end 61, the rotating shaft 63 and the supporting end 64, where three limiting plates 4 are preferably provided. A threaded hole (not shown in the drawings) matched with the rotating shaft 63 is arranged in a center of the connecting base 71. When the fixed end 61, the connecting end 62 and the rotating shaft 63 are connected, an angle of the rotating shaft 63 may be changed through the connecting end 62, so that the stirring member 7 may also be oblique after being screwed and fixed on the bottom portion of the rotating shaft 63 through the connecting base 71. Such arrangement may change an angle between the rotating member 6 and stirring member 7 and the central axis of the lithium extraction container, thus ensuring that a larger stirring range may be obtained when the motor 5 drives the rotating member 6 and the stirring member 7 to rotate. Moreover, the screw-connected connecting base 71 and rotating shaft 63 are easy to be disassembled, so that the stirring member 7 may be conveniently removed from the bottom portion of the rotating member 6 after the stirring mechanism finishes stirring, and the separating hopper 72 and the filter cylinder 74 of the stirring member 7 may be cleaned. The arrangement of the limiting plates 41 and the supporting end 64 may better ensure a stability of the rotating member 6 in rotation, and ensure that the rotating member 6 may drive the stirring member 7 to rotate and swing at a certain angle.

Figure 3:
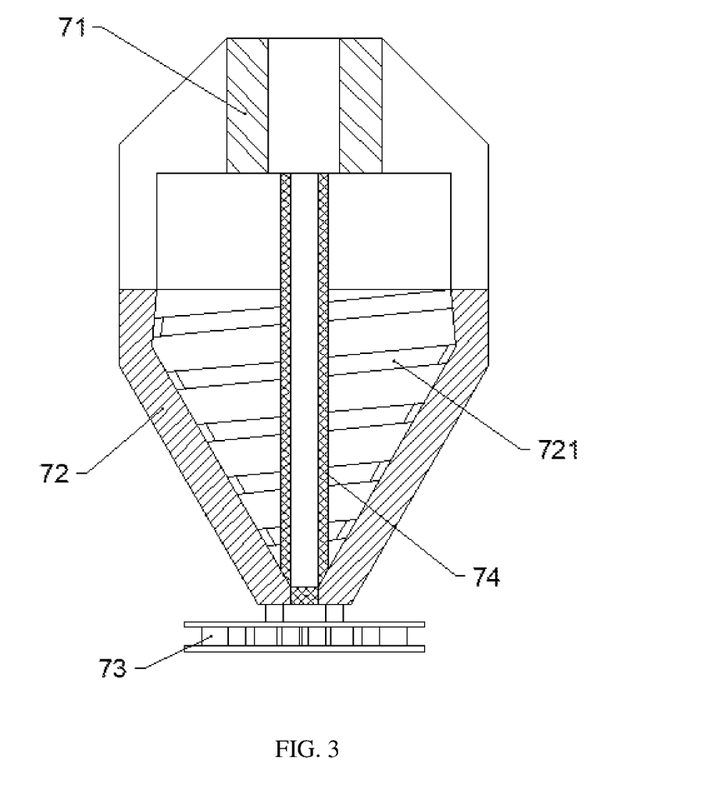
FIG. 3 is a schematic structural diagram of a cross section of a stirring member of the present disclosure.
Figure 4:
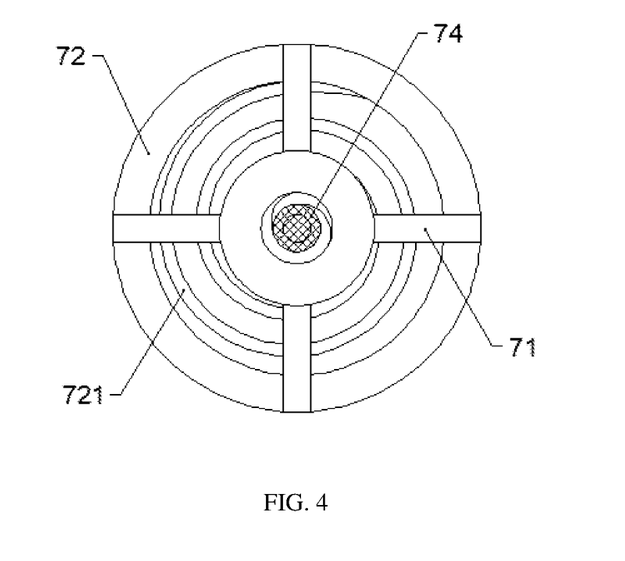
FIG. 4 is a schematic structural diagram of a top view of the stirring member of the present disclosure.
Figure 5:
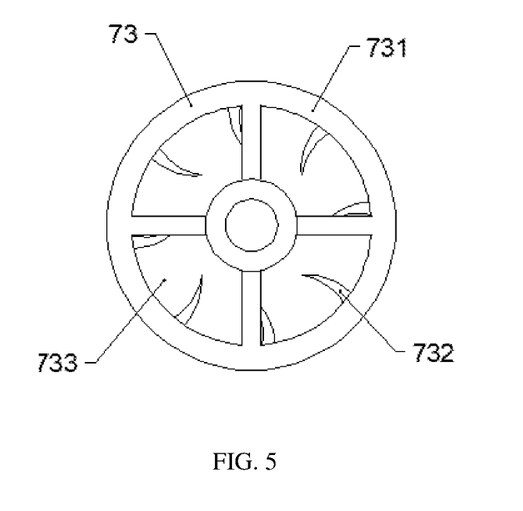
FIG. 5 is a schematic structural diagram of a top view of a stirring wheel of the present disclosure.

As shown in FIG. 3 to FIG. 5, in the embodiment, the stirring wheel 73 includes a connecting frame 731 and a baffle 733, the connecting frame 731 is connected with the separating hopper 72, and blades 732 are circumferentially arranged between the connecting frame 731 and the baffle 733. In the embodiment, the blades 732 are hook-shaped, and a thickness of one end of the blade 732 close to a central point of the connecting frame 731 and the baffle 733 is smaller than that of one end of the blade 732 close to an outer circumference of the connecting frame 731 and the baffle 733. When the stirring wheel 73 in a special shape rotates synchronously with the separating hopper 72, the solution led out of the separating hopper 72 may pass through the connecting frame 731 to reach the blades 732, and the baffle 733 blocks flowing of the liquid, so that the liquid may be guided by the blades 732 to circumferentially spread along an outer circumferential direction of the stirring wheel 73, thus further promoting the flowing of the solution, and accelerating the mixing of the waste liquid of the lithium iron phosphate battery with the chemical agent.

To sum up, according to the stirring mechanism for extracting lithium from the waste liquid of the lithium iron phosphate battery provided by the present disclosure, by using the obliquely arranged rotating member 6, the rotating member 6 and the stirring member 7 form a certain angle with the central axis of the container during rotation with the motor 5, so as to expand a stirring range of the stirring member 7 during rotation and stirring, and accelerate fusion between the waste liquid of the lithium iron phosphate battery and the chemical agent, thus making the mixed solution react quickly, so that other metal elements in the waste liquid of the lithium iron phosphate battery are quickly precipitated and agglomerated. After the solution enters the separating hopper 72, the stirring member 7 in a special shape may have a self-absorption phenomenon between the bottom portion of the separating hopper 72 and the stirring wheel 73, which accelerates flowing of the liquid between the separating hopper 72 and the filter cylinder 74, so that other metal elements precipitated and agglomerated may be deposited in the filter cylinder 74 under an action of the flowing solution, thus achieving the purpose of separating other metal elements in the waste liquid of the lithium iron phosphate battery. Moreover, the spiral protrusion 721 arranged on the inner wall of the separating hopper 72 can accelerate the flowing of the solution inside the separating hopper 72, thus promoting a precipitation rate of the solution at the filter cylinder 74, and improving an extraction efficiency of other metal elements in the waste liquid of the lithium iron phosphate battery.

In the descriptions of the specification, the descriptions with reference to the terms "one embodiment", "some embodiments", "example", "specific example" or "some examples", etc., refer to that specific features, structures, materials, or characteristics described with reference to the embodiments or examples are included in at least one embodiment or example of the present disclosure. In the specification, the schematic representation of the above terms should not be understood as necessarily referring to the same embodiment or example. Moreover, the specific features, structures, materials or characteristics described may be combined in any one or more embodiments or examples in a suitable manner. In addition, those skilled in the art may join and combine different embodiments or examples described in the specification.

Although the embodiments of the present disclosure have been shown and described above, it may be understood that the above embodiments are exemplary and cannot be understood as limiting the present disclosure, and those of ordinary skills in the art may make changes, modifications, substitutions and variations to the above embodiments within the scope of the present disclosure.

The invention claimed is:

1. A stirring apparatus for extracting lithium from a waste liquid of a lithium iron phosphate battery, comprising a pedestal, a clamping mechanism and a stirring mechanism; the clamping mechanism being movably connected to a bottom portion of the pedestal; and the stirring mechanism being rotatably arranged between the pedestal and a fixed portion of the clamping mechanism; wherein the stirring mechanism comprises a motor, a rotating member and a stirring member; the motor is fixed at one end of the pedestal; the rotating member is rotatably arranged in a center of the fixed portion of the clamping mechanism and connected to an output end of the motor, and the rotating member is obliquely arranged; the stirring member is detachably connected to a bottom portion of the rotating member; the stirring member comprises a connecting base, a separating hopper and a stirring wheel which are connected in sequence; the connecting base is threadedly connected to the rotating member, and a connecting claw is arranged on an outer side of the connecting base for connecting the separating hopper; and the separating hopper has a hopper-shaped structure with a large top and a small bottom, a spiral protrusion is arranged on an inner wall of the separating hopper, a filter cylinder is vertically arranged above an opening at a bottom portion of the separating hopper, a top end of the filter cylinder extends to a bottom portion of the connecting base, and an isolation net is arranged in an opening at a bottom end of the separating hopper at a bottom portion of the filter cylinder;

wherein the clamping mechanism comprises a movable plate and a fixed plate; the fixed plate is connected to a middle section at the bottom portion of the pedestal, and guide plates are arranged on both sides of the fixed plate for limiting the movable plate; the movable plate is slidably arranged at the bottom portion of the pedestal on one side of the fixed plate far away from the motor; and a locking knob is arranged at one end of the pedestal far away from the motor for locking the movable plate.

2. The stirring apparatus for extracting lithium from the waste liquid of the lithium iron phosphate battery according to claim 1, wherein a transverse bending section is arranged at a middle portion of the movable plate, and the movable plate at upper and lower ends of the transverse bending section and the fixed plate are parallel to each other.

3. The stirring apparatus for extracting lithium from the waste liquid of the lithium iron phosphate battery according to claim 1, wherein the rotating member comprises a fixed end, a connecting end and a rotating shaft; the fixed end is connected to an output end of the motor, and the connecting end is obliquely connected to a bottom portion of the fixed end; and the rotating shaft is fixed at a bottom portion of the connecting end, and a thread matched with the connecting base is arranged at a bottom end of the rotating shaft.

4. The stirring apparatus for extracting lithium from the waste liquid of the lithium iron phosphate battery according to claim 3, wherein a middle section of the rotating shaft is sleeved with a supporting end; and the fixed plate is provided with, on one side close to the rotating member, at least three limiting plates for limiting swing amplitudes of the fixed end, the rotating shaft and the supporting end.

5. The stirring apparatus for extracting lithium from the waste liquid of the lithium iron phosphate battery according to claim 1, wherein the stirring wheel comprises a connecting frame and a baffle, the connecting frame is connected with the separating hopper, and blades are circumferentially arranged between the connecting frame and the baffle.

6. The stirring apparatus for extracting lithium from the waste liquid of the lithium iron phosphate battery according to claim 5, wherein the blades are hook-shaped, and a thickness of one end of the blade close to a central point of the connecting frame and the baffle is less than that of one end of the blade close to an outer circumference of the connecting frame and the baffle.

7. The stirring apparatus for extracting lithium from the waste liquid of the lithium iron phosphate battery according to claim 2, wherein the rotating member comprises a fixed end, a connecting end and a rotating shaft; the fixed end is connected to an output end of the motor, and the connecting end is obliquely connected to a bottom portion of the fixed end; and the rotating shaft is fixed at a bottom portion of the connecting end, and a thread matched with the connecting base is arranged at a bottom end of the rotating shaft.

8. The stirring apparatus for extracting lithium from the waste liquid of the lithium iron phosphate battery according to claim 7, wherein a middle section of the rotating shaft is sleeved with a supporting end; and the fixed plate is provided with, on one side close to the rotating member, at least three limiting plates for limiting swing amplitudes of the fixed end, the rotating shaft and the supporting end.

* * * * *